United States Patent [19]
Bjenne et al.

[11] Patent Number: 5,452,304
[45] Date of Patent: Sep. 19, 1995

[54] METHOD AND A DEVICE FOR DESTINATION AND SOURCE ADDRESSING IN A PACKET NETWORK

[75] Inventors: Karl A. Bjenne, Huddinge; Ib N. Andersen, TrAngsund, both of Sweden

[73] Assignee: Telefonaktiebolaget LM Ericsson, Stockholm, Sweden

[21] Appl. No.: 760,922

[22] Filed: Sep. 17, 1991

[30] Foreign Application Priority Data

Sep. 19, 1990 [SE] Sweden ................ 9002982

[51] Int. Cl.⁶ .................................. H04J 3/24
[52] U.S. Cl. ........................ 370/94.1; 370/54; 371/30
[58] Field of Search ............ 370/94.1, 60, 85.1, 370/85.2, 54, 60.1, 94.2, 16, 94.3; 371/32, 34, 33, 30

[56] References Cited

U.S. PATENT DOCUMENTS

| | | | |
|---|---|---|---|
| 4,049,906 | 9/1977 | Hafner et al. | 178/2 C |
| 4,625,306 | 11/1986 | Newman | 370/60 |
| 4,651,318 | 3/1987 | Luderer | 370/94 |
| 4,696,000 | 9/1987 | Payne, III | 370/60 |
| 4,980,913 | 12/1990 | Skret | 380/23 |
| 4,993,018 | 2/1991 | Hajikano et al. | 370/54 |
| 5,003,533 | 3/1991 | Watanabe | 370/85.4 |
| 5,008,882 | 4/1991 | Peterson et al. | 370/94.3 |
| 5,105,424 | 4/1992 | Flaig et al. | 370/94.1 |
| 5,170,393 | 12/1992 | Peterson et al. | 370/60 |
| 5,287,343 | 2/1994 | Nakamura et al. | 370/94.3 |

OTHER PUBLICATIONS

Patent Abstracts of Japan, vol. 10, No. 376, E464, Abstract of JP 61-169042 (Jul. 30, 1986).

*Primary Examiner*—Douglas W. Olms
*Assistant Examiner*—Shick Hom
*Attorney, Agent, or Firm*—Burns, Doane, Swecker & Mathis

[57] ABSTRACT

In the transfer of information packets in a network the information (7) is transmitted by the sending terminal station (1A) provided with a destination address field (9). The destination address field (9) comprises references or codes of the input lines/output lines or connection lines which are to be used when the information packet is retransmitted from nodes (5) in the network. In the corresponding way each information packet is in a node provided with address information in a return address field (11) indicating the connection line or combined input line/output line on which the information packet arrived to the node (5). Thereby the information packet, in a simple way, is provided with a return address and it may be utilized by the receiving terminal station ($1_B$) for instance for the transfer of a receipt message.

9 Claims, 4 Drawing Sheets

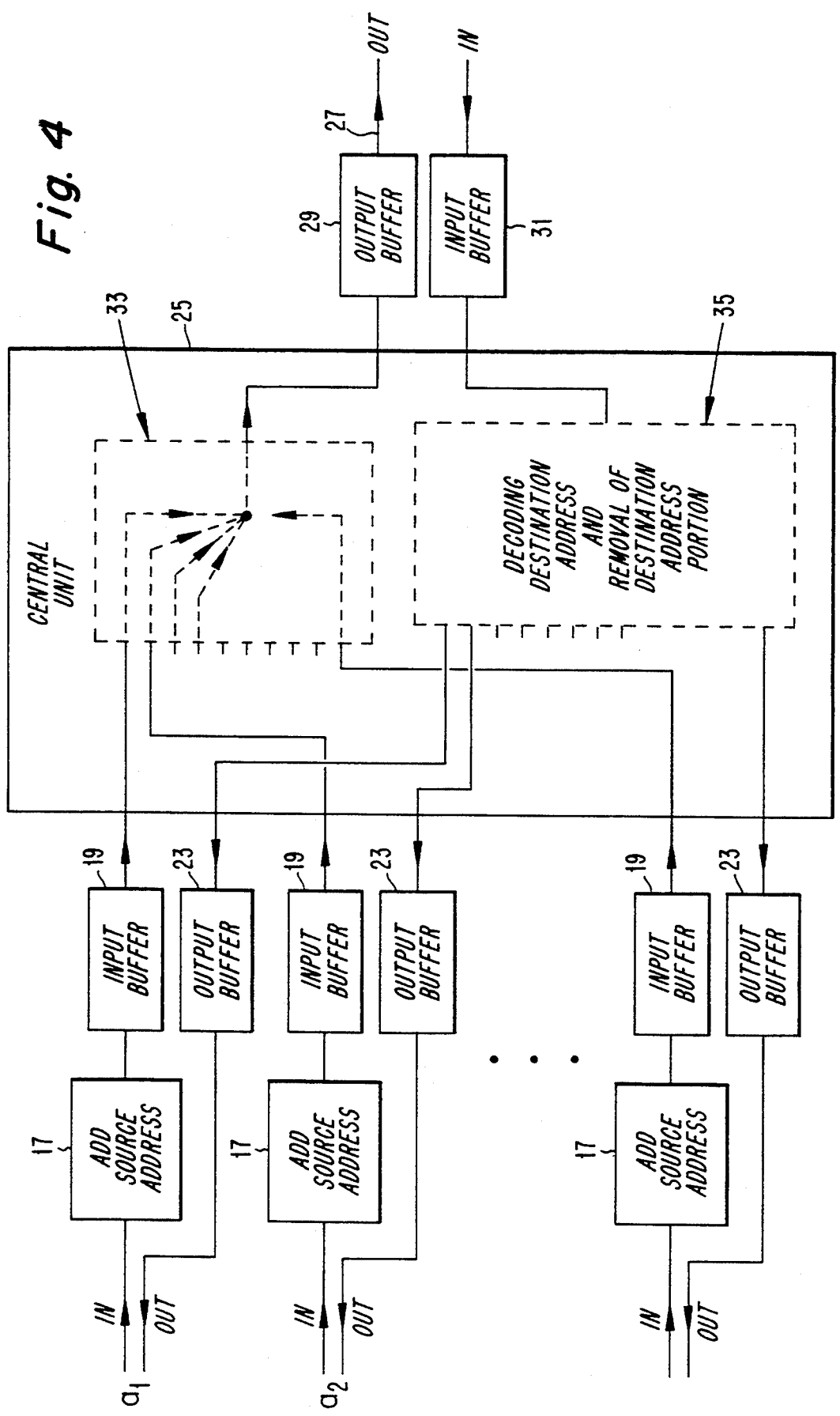

METHOD AND A DEVICE FOR DESTINATION AND SOURCE ADDRESSING IN A PACKET NETWORK

TECHNICAL FIELD

The present invention is related to the transfer of information in networks and in particular to providing the information packets or messages transferred in the network with addresses of their destinations and sources.

BACKGROUND OF THE INVENTION

Networks of the kind mentioned above are disclosed in JP-A-61-169042 and the U.S. Pat. Nos. 4,049,906, 4,625,306, 4,651,318. In these prior systems there is in each transferred message an address portion by means of which the information packet is guided or routed through the switching nodes of said systems.

In the transfer over a data network of messages of type switching messages for an automatic telephone network often a receipt is required to prove that the transferred message has arrived correctly to the receiving station. The receipt message then has to be provided with a return address indicating the original source station. In the transfer of short messages of the kind mentioned it is important that the messages should not be unduely prolonged by complicated addresses of the source station and the receiving or destination station. A method of solving this problem, used for the address of the receiving station, is described in the three first, above mentioned documents. Thus in each transferred message there is an address portion. This address portion contains information especially directed to the nodes informing the nodes of the output line on which the message is to be sent from the node. The part of the address information in the information packet which is relevant to the node is then removed in the node, when the node has used its address information to select one of several possible output lines. In this way the message will be shorter when it approaches its destination.

SUMMARY OF THE INVENTION

According to the invention it is proposed that the information packets in a corresponding way are provided with return addresses. Each transferred packet is thus in a node provided with information indicating the input line on which the message arrived to the node. The condition for this obviously is that said node has several possible input lines. This information, which is added to the message, is placed in order or successively in relation to the same address information obtained from earlier nodes and it is placed in a special field in the address portion of the message.

In some types of data networks having no principal nodes or concentrators or expansion points the message transferred will thus have an address portion, where the destination addresses are constructed symmetrically in relation to the return addresses. The message will thus have a constant length when it is transferred through the data network. In other network types the message will in some nodes increase its length and in some nodes decrease its length.

BRIEF DESCRIPTION OF THE DRAWINGS

The invention will now be described with reference to the accompanying drawings in which FIG. 4 illustrates a block diagram of a typical node in a network having a hierarchical structure.

DESCRIPTION OF A PREFERRED EMBODIMENT

Figure 1:
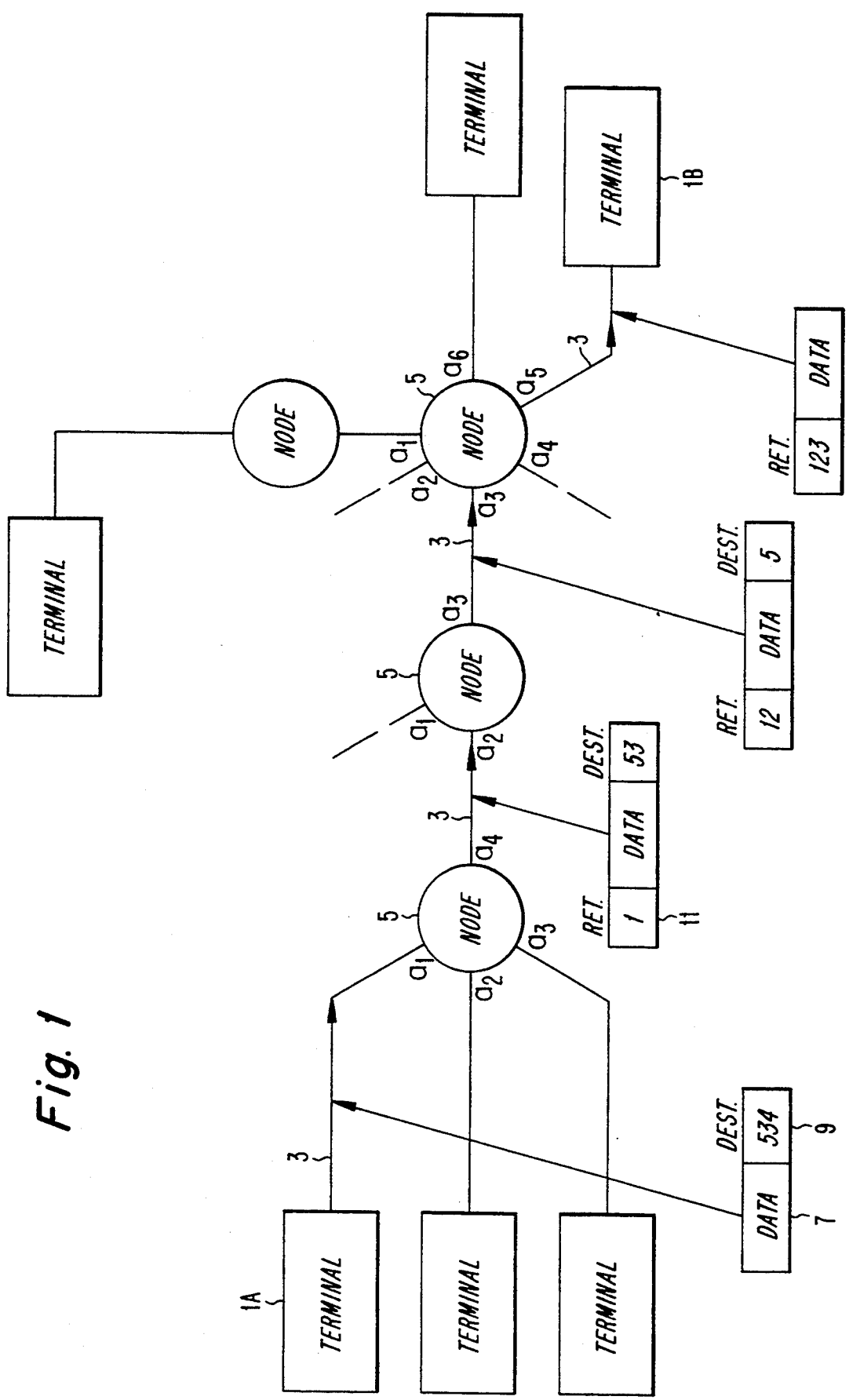
FIG. 1 illustrates a network having a non-hierarchical structure.

In FIG. 1 a network is illustrated having a non-hierarchical structure. In this network there are a number of stations or terminals $1_A$, $1_B$, ... From these terminals messages or data packets are transmitted and received. From each terminal $1_A$, $1_B$, ... there is at least one connection line 3, this line having its other end connected to some node 5 inside the network. A node is an intermediary switching point in the network which can both receive messages and retransmit these messages through the network and in some cases it may also be designed to generate by itself new messages or be the final destination station of some messages. From the nodes 5 further connection lines extend to other nodes 5 or to other terminals $1_A$, $1_B$, ..., these other nodes being in their turn connected to further nodes or terminal stations.

For each node 5 its connected lines 3 are provided with a unique designation or reference, for instance having numbers 1, 2, 3, ... and in the drawings they have the references $a_1$, $a_2$, $a_3$, ... These reference signs are used for all the combined input lines/output lines of a node. In a node 5 in a network of this kind all the connected lines are equivalent, that is they can work both for transmitting information from and receiving information in or by the node.

The procedure in sending a message from a terminal $1_A$ to a terminal $1_B$ will now be described with reference to the example illustrated in FIG. 1. The message comprises a data portion 7 and an address portion. In the address portion is indicated how the information is to be transmitted through the system. This information of the address is to be found in a destination address field 9 which successively, in a correct order contains designations, references as numbers of the combined input lines/output lines, that is the connection lines, on which the message is to be retransmitted from each node which it will pass in its travel through the network. In the case illustrated in FIG. 1 the destination address portion 9 contains the numbers 5, 3 and 4 and this means particularly that the message should be transmitted on the connection line/output line having the number 4 and the reference sign $a_4$ in FIG. 1 from the first node to which the message will arrive. When the message is sent from this first node, it will arrive to a second node and from this node the message is forwarded on its output terminal having the number 3 and the reference $a_3$ in FIG. 1. In the same way the transfer is made in the third and last node through which the message will pass.

In each node 5 also the portion of the destination address field is removed which is applicable to this node. In the first node in the example illustrated in FIG. 1 thus the number 4 is removed from the destination address field and this field will contain when it is retransmitted from the first node only the numbers 5 and 3. The corresponding removal will be made in the two other nodes.

In order to send a receipt message from a receiving station when it has received a message, also the messages travelling through the network are provided with return addresses. For this purpose there is in the address portion of the message a special field designed for the return address. In this field is inserted, in each node, to which a message arrives, an indication of the connection line or combined input line/output line on which the message arrived to this node. In the example illustrated in FIG. 1 thus the number 1 is entered into the return address portion which indicates that the message arrived to this node, the first one, on the connection line or the combined input line/output line having the number 1 and the reference $a_1$ in FIG. 1. In the second node through which the message will pass the return address field 11 is further extended by the procedure that to this field is added the number 2 indicating that the message arrived to this node, the second one, on the connection line having the number 2 and the reference sign $a_2$ in FIG. 1. The corresponding procedure is performed in the third node which will transfer the message in its travel to the terminal station $1_B$.

In a network of this non-hierarchical kind the messages thus will have a constant total length and this length is also made as short as possible since all unneccessary information is removed in each node.

Figure 2:
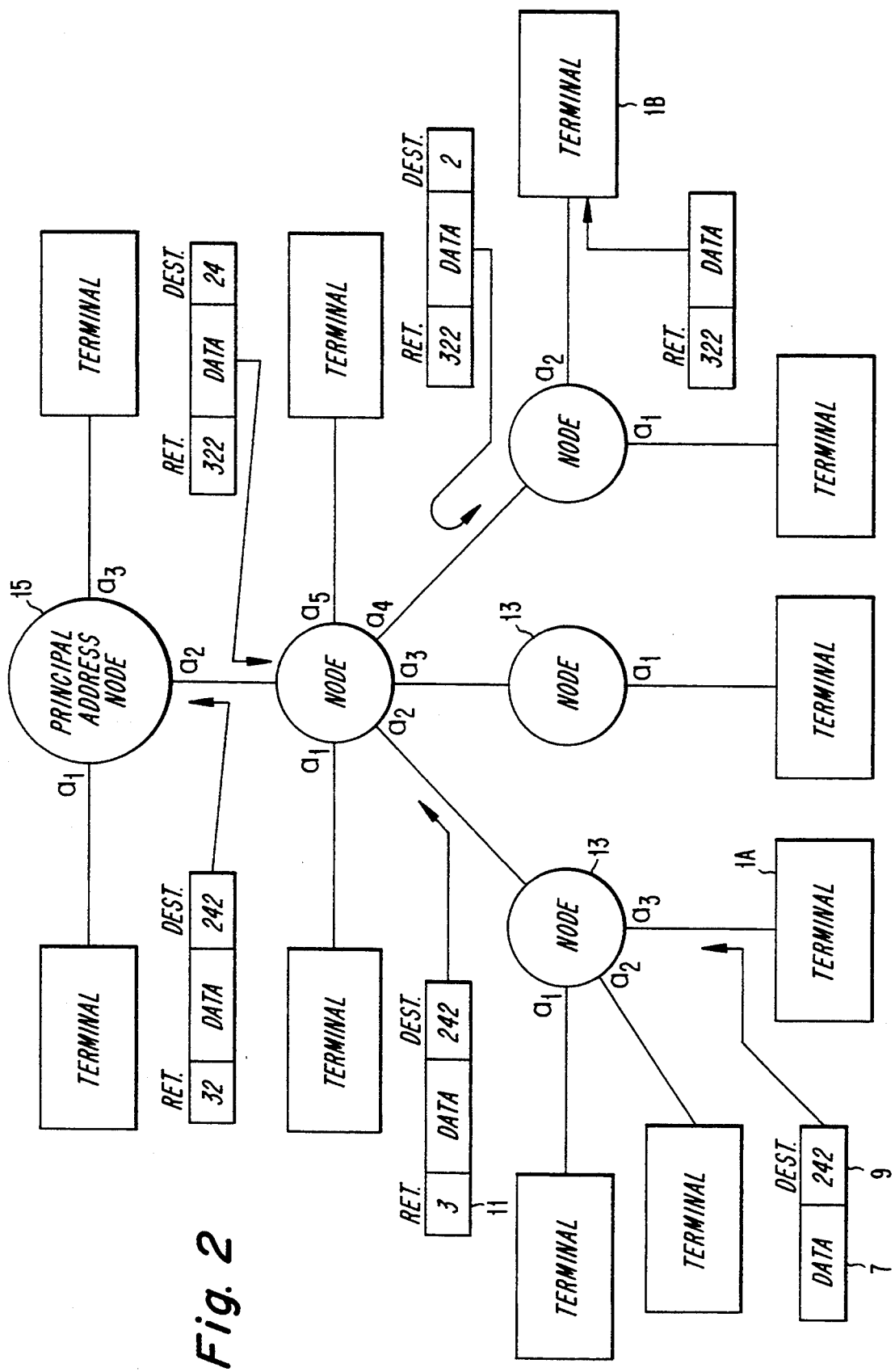
FIG. 2 illustrates a network having a hierarchical structure.

In FIG. 2 a network is illustrated having a hierarchical structure. In this, as in the network of FIG. 1, there are a number of terminal stations $1_A$, $1_B$, . . . , connection lines 3 and nodes 13. In addition there is a principal or top node 15 through which all messages in the network must pass.

The process in transferring information from one terminal station to another terminal station in this system will be a little different from what is performed in the network depicted in FIG. 1. A message will here not require any destination addresses in order that the message should be transferred to the principal node 15 and thus the destination address field will only contain address information relevant to the nodes through which the message must pass from and including the principal node 15. This will mean that the first number or reference of a connection line/output line from a node in the destination address field indicates the output line, on which the message is to be retransmitted from the principal node 15.

In a node in this kind of network its connected lines are not equivalent. The node has one line directed towards the principal node 15 and generally several other lines connected to other nodes or terminal stations, these other lines thus being located in the direction towards the neighbouring terminals.

In FIG. 2 is illustrated as an example the transfer of information from a terminal station $1_A$ to a terminal station $1_B$. The message comprises when it is transmitted from the terminal station $1_A$ a data portion 7 and an address portion having a destination field 9. From the terminal station $1_A$ it is transmitted to the principal node 15 through intermediary ordinary nodes 13. These are arranged in such a way that when the message arrives to the side of the node which is directed towards the neigbouring terminal stations this message will be retransmitted on the single connection line which is directed towards the principal node 15. In the first node also the information packet is provided with a return address field in the same way as in the network illustrated in FIG. 1. In this case only the connection lines or combined input lines/output lines have to be indicated which are directed towards the neighbouring terminal stations have to be provided with identifying references, that is these are numbered as above 1, 2, 3, . . . and in FIG. 2 they have the references $a_1$, $a_2$, $a_3$, ... The reference or the number associated with the connection line on which the message has arrived to the node is written into the return address field 11. This field is thus enlarged from not containing any information to a state where it contains a number or other reference of the connection line of the node in the direction towards the neighbouring terminal stations. Since the destination address field in the message has not been used in this node no information is removed from the destination field in the node. The message is retransmitted to the next node in the direction towards the principal node 15. In this next node the return address field is prolonged in the same way with the number 2 indicating that the message has arrived to the node on its connection line having the number 2 and the reference $a_2$ in FIG. 2. The return address field will now comprise two positions. The message is retransmitted to the principal node where the return address field is enlarged in the same way.

The principal node 15 will then forward the message and will use the destination address field to select the connection line or input line/output line on which the message is to be sent from the principal node 15. Before the actual transfer, however, the information is removed, in this case the number 2, indicating that the message is sent on the connection of the principal node having the number 2.

The message will then arrive to the next node and the output line which is to be selected for the transmission of the message is taken from the destination field of the address portion and in the same instance this information is removed from the address field. In the next node the same procedure is repeated and finally the message will arrive to the destination station $1_B$. The message will then have no destination address field 9 but a complete return address field intended for the possible transmission of a receipt message.

Figure 3:
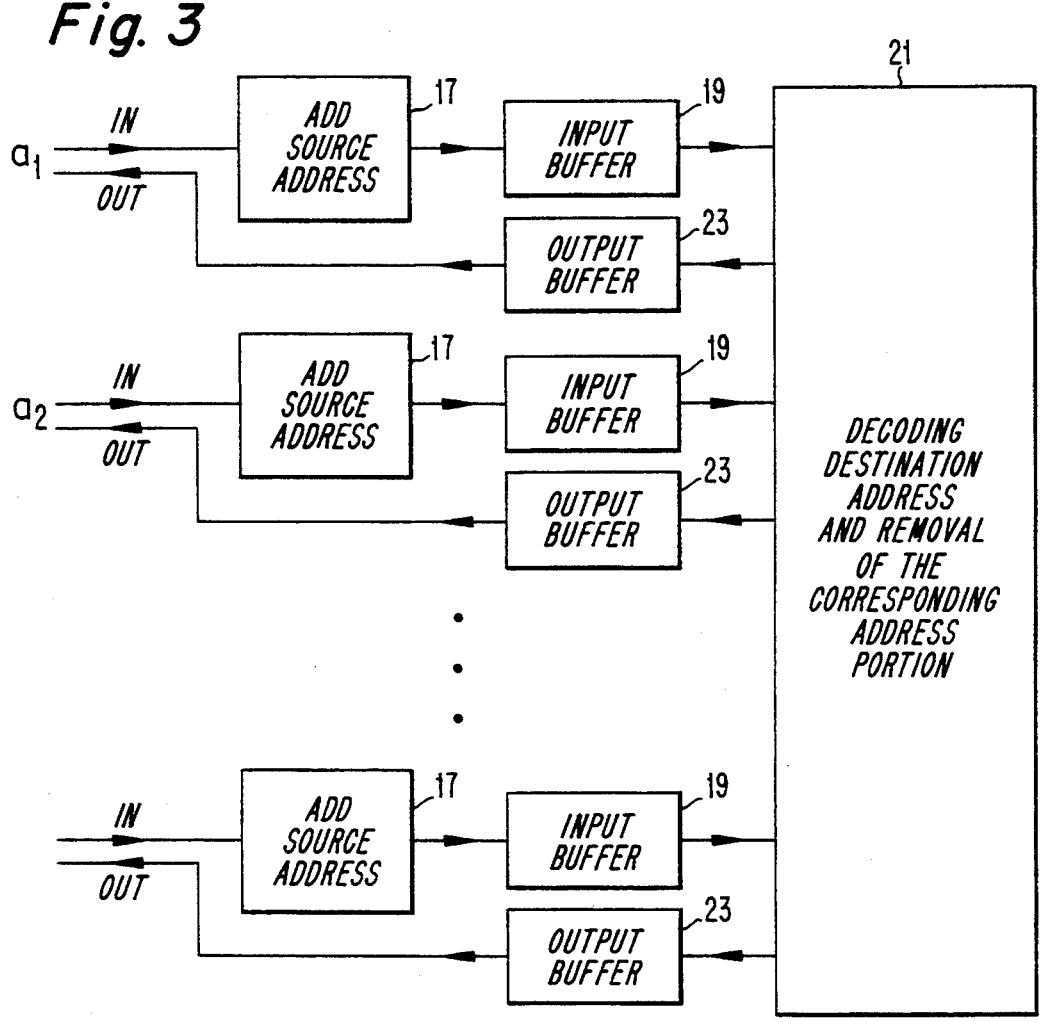
FIG. 3 illustrates a block diagram of a typical node in a network having a non-hierarchical structure.

In FIG. 3 is illustrated an example of the construction of a node in a non-hierarchical net. This construction is also fundamentally applicable to the principal node 15 in a network having a hierarchical architecture like the one in FIG. 2. A number of combined input lines/output lines $a_1$, $a_2$, . . . are connected to the node. These connection lines thus comprise both a part line to transmit information into the node and a part line for transmitting information from the node. Every incoming line is first connected to a unit 17 in which the source address relevant to this node is inserted in an information packet. This unit 17 thus enters the relevant number of the combined input line/output line in a field which for this purpose is provided in the information packet. The unit 17 for adding the source address is connected to an input buffer 19 where a received information packet is stored waiting to be retransmitted. The buffer for the incoming messages is also connected to a central unit 21 of the node which may be a processor.

The outgoing part line of a connection line $a_1$, $a_2$, . . . extends from a buffer 23 for outgoing messages. This output buffer 23 will receive the information packets directly from the central unit 21.

The central unit 21 has in this illustrated embodiment the intelligence necessary to a node and monitors the buffers 19 and 23 for incoming and outgoing messages respectively. When a message which has arrived to the node is to be forwarded this message is processed by the central unit 21. It will thus decode the destination address of the information packet and select the correct output line $a_1, a_2, \ldots$ for retransmission of the information packet. In addition this address portion is removed from the destination address field, that is precisely this information of the output line which is associated with this node.

A node may apparently also be constructed of simpler logical elements not requiring a processor as in FIG. 3. In this case the control signals neccessary to the node are generated by the individual electronic units. In this way, instead of a processor inside the central unit 21, a particular simpler logic circuit having a suitable design may be used to perform the very few operations required inside the node.

In FIG. 4 is schematically illustrated a possible construction of coupling node in a hierarchical system. When the node is regarded as a concentration point, that is a node transmitting messages in the direction towards the principal node 15, the information flow to the right in FIG. 4 is considered. For an expansion node, that is a node through which a message will pass after the passage of the principal node 15, the parts of FIG. 4 are considered in which the arrows indicating the information flow are directed to the left.

The node 13 has a number of connection lines $a_1, a_2, a_3, \ldots$ which can send messages in both directions. These connection lines may also suitably comprise a part line for transmitting messages to the node and a part line for transmitting messages from the node. These connection lines $a_1, a_2, \ldots$ are directed towards the neighbouring terminal stations 1 in the hierarchical network. In addition, in the same way as the connection lines of a node in a non-hierachical system, they are connected to a central unit 25 via a unit 17 for the addition of a source address and a buffer 19 for received messages and a buffer 23 for messages to be transmitted from the node. To the central unit 15 a connection line is connected which has its other end directed towards the principal node 15. This connection line 27 which is directed towards the principal node 15 comprises two part lines, one for messages transmitted from the node and one for incoming or arriving messages. These part lines are provided with their associated buffers 29 and 31 respectively.

The central unit 25 which here also may be a processor comprises two operational blocks 33 and 35. In the first operational block 33 an incoming message is sent on to the output line 27, this being performed inside the node in such a way that no collision will occur between the incoming messages. In the other operational block 35 principally the same functions are performed as in the central unit 21 of a node in a non-hierarchical network. In the unit 35 only those messages are handled which have arrived on the connection line 27, that is those which origin from the principal node 15. In these messages a destination address is indicated and it is decoded in the subunit 35 and is there removed from the message. The correct output line is selected by means of the removed information.

Figure 5:
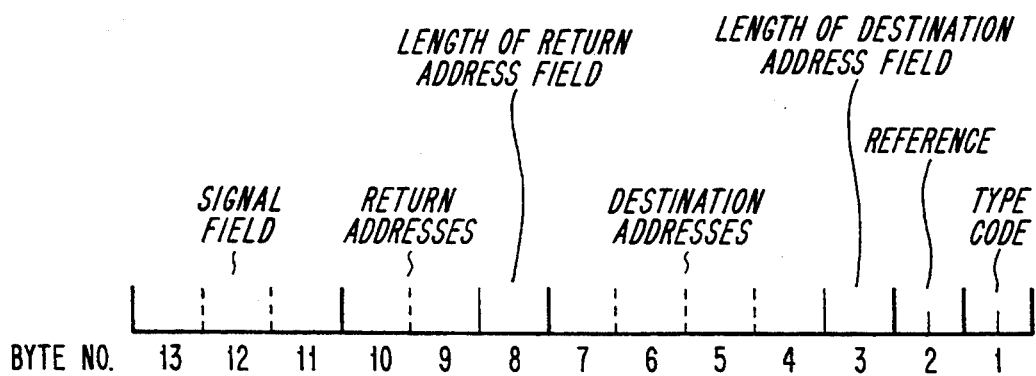
FIG. 5 illustrates the structure of an information packet.

An example of an information packet during the transfer thereof in a network according to FIG. 1 or FIG. 2 is illustrated in FIG. 5. The beginning of the message is shown to the right in the Figure. The message is constructed of data units and thus each information unit can be supposed to have for instance a length of one byte. The message starts with a code for its type having a length of one byte. This type code generally indicates the contents of the message, for instance if the message commands reading or writing some kind of information. The second byte contains a reference indicating the activity in the system with which the message is associated. Then there is a byte indicating the length of the destination address field which is the next field. The destination address field consists, in the illustrated example, of four bytes having the order numbers 4–7. Thus in this case byte 3 must contain the number 4. After the destination address field byte No. 8 is located containing information on the length of the return address field, which is the next adjacent field and contains in successive order the return addresses. In the case illustrated two return addresses are entered and thus byte No. 8 must contain the number 2. Last in the message the proper information of the message is to be found and it is located in the signal field comprising bytes Nos. 11–13.

Instead of using particular portions of a transferred message containing the length of the destination address field and the return address field flags may also be used to separate or define the different fields. These flags may then be special codes only having the meaning that they separate one field from another field.

It is to be understood that the above-described embodiment of a network for switching packets each comprising routing information is merely described as an example illustrative of the principles of the invention; other arrangements and methods may be devised by those skilled in the art without departing from the spirit and scope of the invention.

We claim:

1. In a network comprising terminal stations, intermediary nodes, and connection lines connecting each terminal station to an intermediary node, a method of transferring information packets, comprising the steps of:

addressing an information packet to an intended recipient terminal or node in a destination address portion of said information packet;

transmitting said information packet to and receiving said information packet at an intermediary node other than said intended recipient terminal or node;

adding to said information packet an indication of which connecting line said intermediary node received said information packet on; and retransmitting said information packet from said intermediary node toward said intended recipient terminal or node.

2. The method of claim 1, wherein said step of adding to said information packet further comprises adding said indication in a field of said information packet designated as a return address portion, and comprising the further steps of:

receiving said information packet at and retransmitting said information packet from one or more additional intermediary nodes; and at each intermediary node adding to said information packet in said return address portion an indication of which connection said intermediary node received said information packet on, such that respective indications of respective intermediary nodes are arranged in said return address portion in an order reflecting an order in which said information packet was received at said intermediary nodes.

3. The method of claim 1 wherein said step of addressing an information packet further comprises designating in said destination address portion of said information packet, for each intermediary node expected to receive said information packet, in an order that reflects an order in which said intermediary nodes are expected to receive said information packet, a respective connection line on which each respective intermediary node is to retransmit said information packet, and wherein said retransmitting step further comprises retransmitting said information packet from each respective intermediary node on said respective connection line designated for that intermediary node.

4. The method of claim 3 wherein said retransmitting step further comprises first removing from said destination address portion of said information packet a designation for an intermediary node retransmitting said information packet of said respective connection line on which each respective intermediary node is to retransmit said information packet.

5. A network for transferring an information packet comprising terminal stations, intermediary nodes, and connecting lines connecting each terminal station to an intermediary node, wherein each terminal station comprises:
   means for addressing said information packet to an intended recipient terminal or node in a destination address portion of an information packet; and
   means for transmitting said information packet on a connecting line;
   and each intermediary node comprises:
   means for receiving said information packet on a connecting line;
   means for adding to said information packet an indication of which connecting line said intermediary node received said information packet on; and
   means for retransmitting said information packet from said intermediary node toward said intended recipient terminal or node on a connecting line.

6. The apparatus of claim 5, wherein said means for adding appends said indication to the end of a list of indications, in a return address portion of said information packet, of other intermediary nodes that have previously received said information packet.

7. The apparatus of claim 5 wherein said means for addressing designates in said destination address portion of said information packet, for each intermediary node expected to receive said information packet, in an order that reflects an order in which said intermediary nodes are expected to receive said information packet, a respective connection line on which said respective intermediary node is to retransmit said information packet.

8. The apparatus of claim 7 wherein said means for retransmitting retransmits said information packet on a connection line designated for said intermediary node in said address portion of said information packet.

9. The apparatus of claim 8 wherein said means for retransmitting further comprises means for first removing from said destination address portion of said information packet a designation of a connection line designated for said intermediary node in said address portion of said information packet.

* * * * *